United States Patent
Zur et al.

(10) Patent No.: US 11,240,162 B1
(45) Date of Patent: Feb. 1, 2022

(54) METHOD FOR REMOTE DIRECT MEMORY ACCESS (RDMA) CONGESTION CONTROL OVER AN ETHERNET NETWORK

(71) Applicant: HABANA LABS LTD., Tel Aviv-Jaffa (IL)

(72) Inventors: Itay Zur, Rosh-Haayin (IL); Ira Joffe, Ramat Yohanan (IL); Shlomo Raikin, Tel Aviv-Jaffa (IL)

(73) Assignee: HABANA LABS LTD., Tel Aviv-Jaffa (IL)

( * ) Notice: Subject to any disclaimer, the term of this patent is extended or adjusted under 35 U.S.C. 154(b) by 0 days.

(21) Appl. No.: 16/947,891

(22) Filed: Aug. 23, 2020

(51) Int. Cl.
*H04L 12/807* (2013.01)
*H04L 12/801* (2013.01)

(52) U.S. Cl.
CPC ........... *H04L 47/27* (2013.01); *H04L 47/115* (2013.01)

(58) Field of Classification Search
CPC ......... H04L 43/16; H04L 45/66; H04L 47/00; H04L 47/10; H04L 47/11; H04L 47/12; H04L 47/25; H04L 47/27; H04L 47/115; H04L 47/263
See application file for complete search history.

(56) References Cited

U.S. PATENT DOCUMENTS

| | | | |
|---|---|---|---|
| 2002/0156910 A1* | 10/2002 | Senda | H04L 47/22 709/232 |
| 2005/0117515 A1* | 6/2005 | Miyake | H04L 47/10 370/231 |
| 2010/0046368 A1* | 2/2010 | Kaempfer | H04L 47/10 370/231 |
| 2017/0085485 A1* | 3/2017 | Vanini | H04L 47/762 |
| 2019/0044861 A1* | 2/2019 | Wandler | H04L 47/27 |
| 2019/0342199 A1* | 11/2019 | Hurson | H04L 67/1097 |

\* cited by examiner

*Primary Examiner* — Kan Yuen
(74) *Attorney, Agent, or Firm* — Reches Patents

(57) ABSTRACT

Systems, and method and computer readable media that store instructions for remote direct memory access (RDMA) congestion control.

23 Claims, 10 Drawing Sheets

| MAC 107(1,1) | VLAN 107(1,2) | IPV4 107(1,3) | UDP 107(1,4) | BTH 107(1,5) | AETH 107(1,6) | ECR 107(1,7) | ICRC 107(1,8) | FCS 107(1,9) |

METHOD FOR REMOTE DIRECT MEMORY ACCESS (RDMA) CONGESTION CONTROL OVER AN ETHERNET NETWORK

BACKGROUND

RDMA allows a direct memory access from a memory of one device into that of another without involving an operating system of any of the devices. The RDMA increases the throughput and reduces the latency of networking.

InfiniBand (IB) is a computer networking communications standard used in high-performance computing that features very high throughput and very low latency. IB is used for data interconnect both among and within computers. InfiniBand is also used as either a direct or switched interconnect between servers and storage systems, as well as an interconnect between storage systems. It is designed to be scalable and uses a switched fabric network topology.

RDMA over Converged Ethernet (RoCE) is a network protocol that allows remote direct memory access (RDMA) over an Ethernet network. It does this by encapsulating an IB transport packet over Ethernet.

There are two RoCE versions, RoCE v1 and RoCE v2. RoCE v1 is an Ethernet link layer protocol and hence allows communication between any two hosts in the same Ethernet broadcast domain. RoCE v2 is an internet layer protocol which means that RoCE v2 packets can be routed. Although the RoCE protocol benefits from the characteristics of a converged Ethernet network, the protocol can also be used on a traditional or non-converged Ethernet network. (See: Wikipedia.Org).

Request for comments (RFC) 3168 defines an addition of Explicit Congestion Notification (ECN) over IP protocol. RFC 3168 defines how to signal congestion to the sender through the IP header. The ECN bits signals provide a binary indication—whether or not a congestion was encountered or not along the route.

In protocols that require sending an acknowledgement (ACK) message to the sender per each received packet—the sender receives the binary indication per each sent packet—and may evaluate the state of the route.

In cases where an ACK message is not sent per each sent packet—the sender may be unaware of the state of the route.

There is a growing need to provide a more efficient method for evaluation of a state of the route.

SUMMARY

There may be provided systems, methods, and computer readable medium as illustrated in the specification.

BRIEF DESCRIPTION OF THE DRAWINGS

The embodiments of the disclosure will be understood and appreciated more fully from the following detailed description, taken in conjunction with the drawings in which:

FIG. 7 illustrates an example of an ACK message.

DETAILED DESCRIPTION OF THE DRAWINGS

Figure 1:
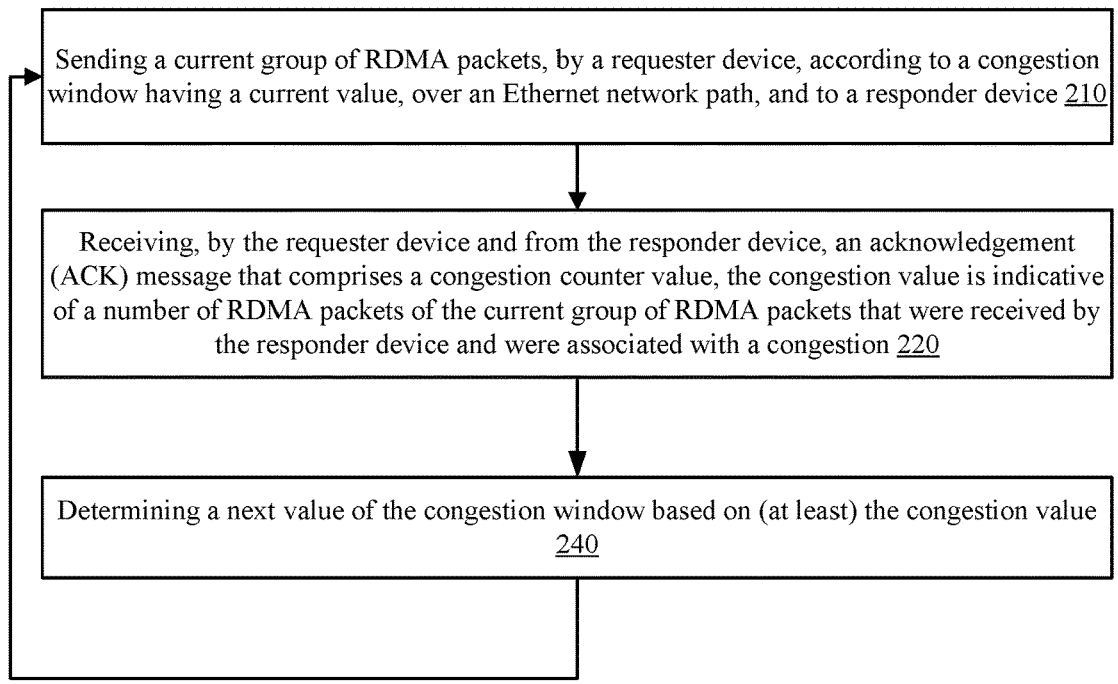
FIG. 1 illustrates an example of a method.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a processor, or to a controller, or to a module, or to a unit. Any one of the processor, the controller, the module or the unit may be or may include a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

FIG. 1 illustrates a method 200 for remote direct memory access (RDMA) congestion control.

Method 200 may start by step 210 of sending a current group of RDMA packets, by a requester device, according to a congestion window having a current value, over an Ethernet network path, and to a responder device.

The congestion window may determine the maximal number of RDMA packets that can be sent by the requester device without getting an ACK message related to any of the RDMA packets.

It is assumed that the number of RDMA packets included in the current group equals the number allowed by the congestion window.

The number of RDMA packets sent by the requester device may be of any positive integer value.

Step 210 may be followed by step 220 of receiving, by the requester device and from the responder device, an acknowledgement (ACK) message. The ACK message may include a congestion value.

Furthermore—any reference to message should be applied mutatis mutandis to any information unit (or units) that convey ACK information.

The congestion value is indicative of a number of RDMA packets of the current group of RDMA packets that were received by the responder device and were associated with a congestion.

The congestion value may be a congestion counter value that counts the number of RDMA packets of the current group of RDMA packets that were received by the responder device and were associated with a congestion—for example marked with ECN bits by the switch. Alternatively—the congestion value may differ from a congestion counter value.

Any RDMA packet that was associated with any congestion (while propagating from the requester device to the responder device) may be tagged or marked by any type of a congestion indication.

The ACK message may be sent from the responder device and propagate via an Ethernet path between the requester device and the responder device.

The ACK message may include a field dedicated to the congestion value.

The RDMA packet may be an RDMA over Converged Ethernet (RoCE) version two (RoCE V2) packet, or any other type of packet.

Each one of the requester device and the responder device may include a network interface card (NIC). The NIC of the requester device may execute the steps of method 200. Each one of the requester device and the responder device may be a computer, a part of a computer, at least a part of a communication device, at least a part of a network component, may include one or more processing circuits, and the like.

In contrary to methods that require a reception of an ACK message for each received RDMA packet—method 200 may involve receiving only one ACK message per current group of RDMA packets. The ACK message may include an identifier of the last RDMA packet of the current group.

Step 220 may be followed by step 240 of determining a next value of the congestion window based, at least, on the congestion value.

Multiple iterations of method 200 may be executed. Accordingly—step 240 may be followed by step 210. The next value calculated in step 240 will become the current value of the congestion window during step 210 of the next iteration.

The next value may be determined based on one or more other parameters—such as the current value of the congestion window (as calculated during a current iteration of method 200), a round trip time (RTT), and the like. Any known method for calculating the next value based at least on the congestion value may be used.

For example—if the congestion value exceeds a predefined threshold—the next value of the congestion window may be lowered below the current value—for example according to the data center transmission control (DCTCP) protocol of RFC 8257.

If, on the other hand, the congestion value is below the predefined threshold—then the next value of the congestion window may be increased above the current value—for example according to TCP cubic protocol of RFC 8312.

Figure 2:
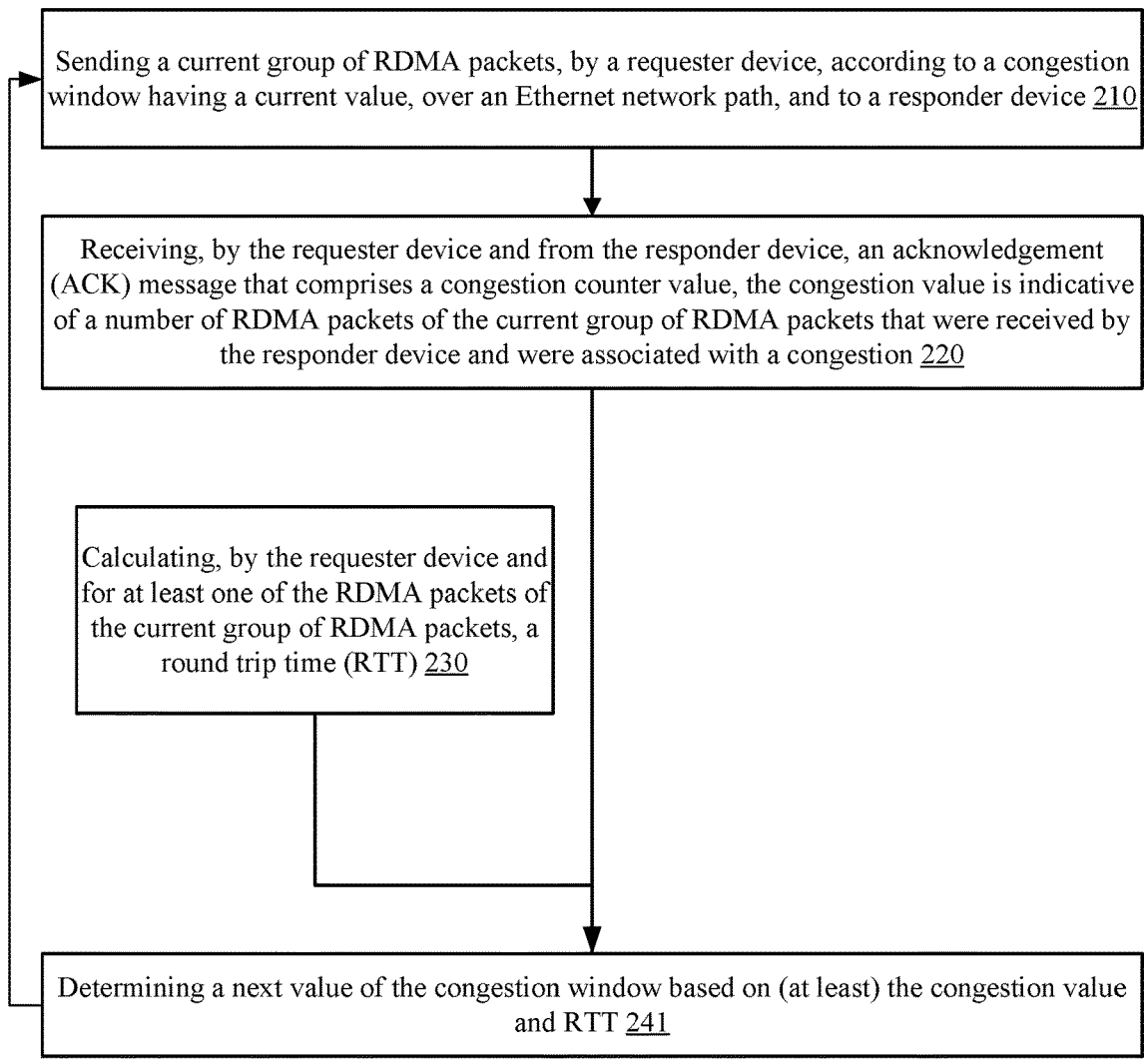
FIG. 2 illustrates an example of a method.

FIG. 2 illustrates a method 201 for remote direct memory access (RDMA) congestion control.

Method 201 may start by step 210 of sending a current group of RDMA packets, by a requester device, according to a congestion window having a current value, over an Ethernet network path, and to a responder device.

Step 210 may be followed by step 220 of receiving, by the requester device and from the responder device, an ACK message. The ACK message may include a congestion value.

Method 200 may also includes step 230 of calculating, by the requester device and for at least one of the RDMA packets of the current group of RDMA packets, a round trip time (RTT). This usually includes calculating the RTT for one of the RDMA packets—for example the first RDMA packet of the current group.

Steps 220 and 230 are followed by step 241 of determining a next value of the congestion window based on (at least) the congestion value and on the RTT.

The next value may be determined based on one or more other parameters—such as the current value of the congestion window, the rate of arriving RDMA packets, and the like. Any known method for calculating the next value based at least on the congestion value may be used.

Multiple iterations of method 201 may be executed. Accordingly—step 241 may be followed by step 210. The next value calculated in step 241 will become the current value of the congestion window during step 210.

Figure 3:
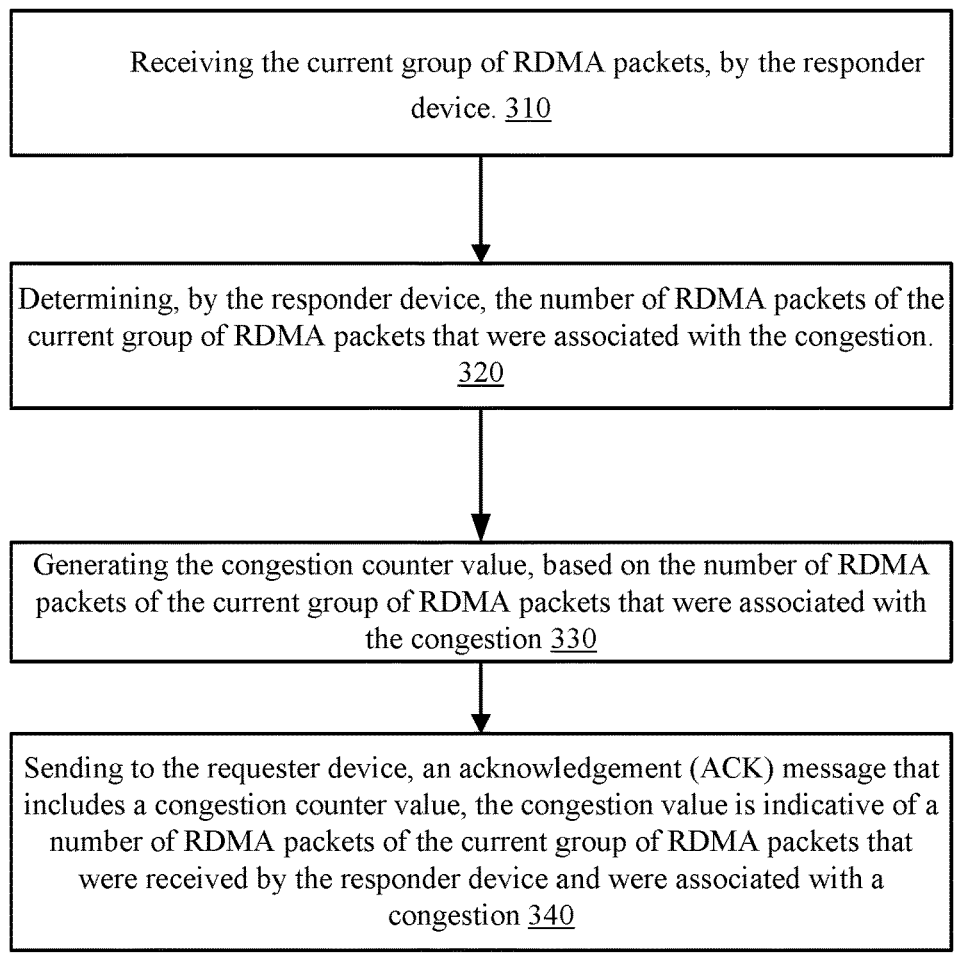
FIG. 3 illustrates an example of a method.

FIG. 3 illustrates a method 300 for remote direct memory access (RDMA) congestion control.

Method 300 may start by step 310 of receiving the current group of RDMA packets, by the responder device.

Step 310 of method 300 may be preceded by step 210 of method 200 or method 201.

Step 310 may be followed by step 320 of determining, by the responder device, the number of RDMA packets of the current group of RDMA packets that were associated with the congestion.

Step 320 may be followed by step 330 of generating the congestion value, based on the number of RDMA packets of the current group of RDMA packets that were associated with the congestion.

Step 330 may include determining to generate the congestion value following a reception of last RDMA packet of the current group of RDMA packets.

Step 330 may include using a congestion counter to count the number of RDMA packets of the current group of RDMA packets that were associated with the congestion.

Step 330 may be followed by resetting the congestion counter following a generation of the congestion value.

Step 330 may be followed by step 340 of sending to the requester device, an acknowledgement (ACK) message that includes a congestion counter value, the congestion value is indicative of a number of RDMA packets of the current group of RDMA packets that were received by the responder device and were associated with a congestion.

Each one of the requester device and the responder device may maintain a pair of queues—an input queue and an output queue.

Step 330 may include storing (by the responder device) RDMA packets of the current group of RDMA packets in an input queue (of the responder device) allocated to traffic from the requester device.

Step 340 of method 300 may be followed by step 220 of method 200 and/or method 201.

Figure 4:
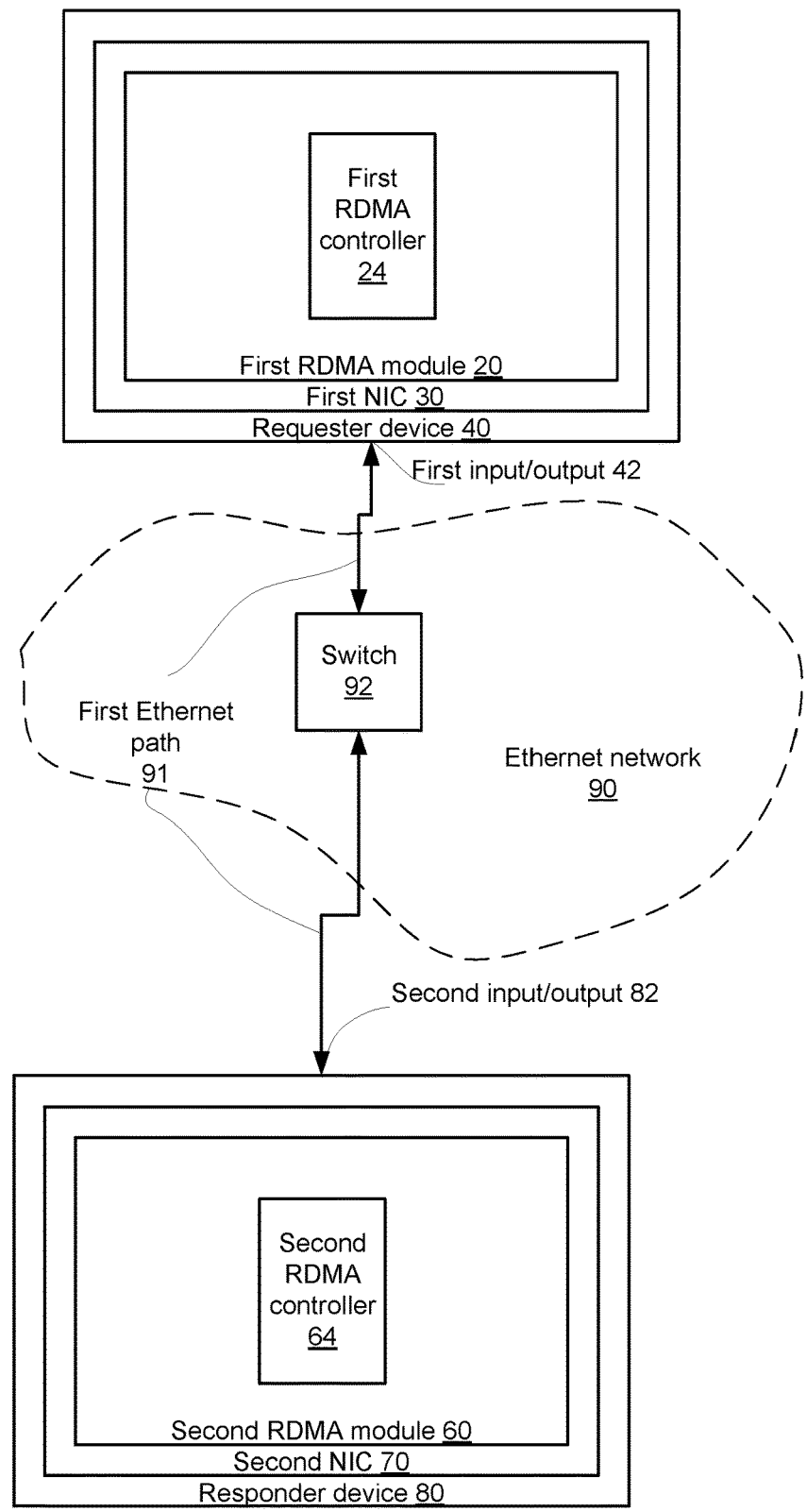
FIG. 4 illustrates an example of a requester device, a responder device, and a network.

FIG. 4 illustrates an example of a requester device 40, a responder device 80 and a network such as an Ethernet network 90. An Ethernet network 90 is configured to support Ethernet protocol compliant transfer of RDMA packets. The Ethernet network 90 may include multiple switches and/or routers.

FIG. 4 illustrates a first Ethernet path 91 which is a path of the Ethernet network 90 and links the requester device 40 to the responder device 80.

The first Ethernet path 91 is illustrated as including a switch 92 that may tag RDMA packets with a congestion indicator (such as ECN) whenever the switch experienced a congestion while switching the RDMA packets.

It should be noted that the first Ethernet path 91 may include more than a single switch.

The requester device 40 is illustrated as including first NIC 30 that in turn includes first RDMA module 20. The first RDMA module 20 is configured to manage RDMA communication. The requester device 40 is illustrates as having a first input and a first output (collectively denoted first input/output 42). The first input/output may be any type of input/output unit.

The first RDMA module 20 includes a first RDMA controller 24 and other units. The first RDMA controller 24 may control the operation of the first RDMA module. The first RDMA controller 24 may, for example, calculate the next value of the congestion window.

The responder device 80 is illustrated as including second NIC 70 that in turn includes second RDMA module 60. The second RDMA module 60 is configured to manage RDMA communication. The responder device 80 is illustrates as having a second input and a second output (collectively denoted second input/output 82). The second input/output may be any type of input/output unit.

The second RDMA module 60 includes a second RDMA controller 64 and other units. The second RDMA controller 64 may control the operation of the second RDMA module 60. The second RDMA controller 64 may, for example, calculate the congestion value.

Figure 5:
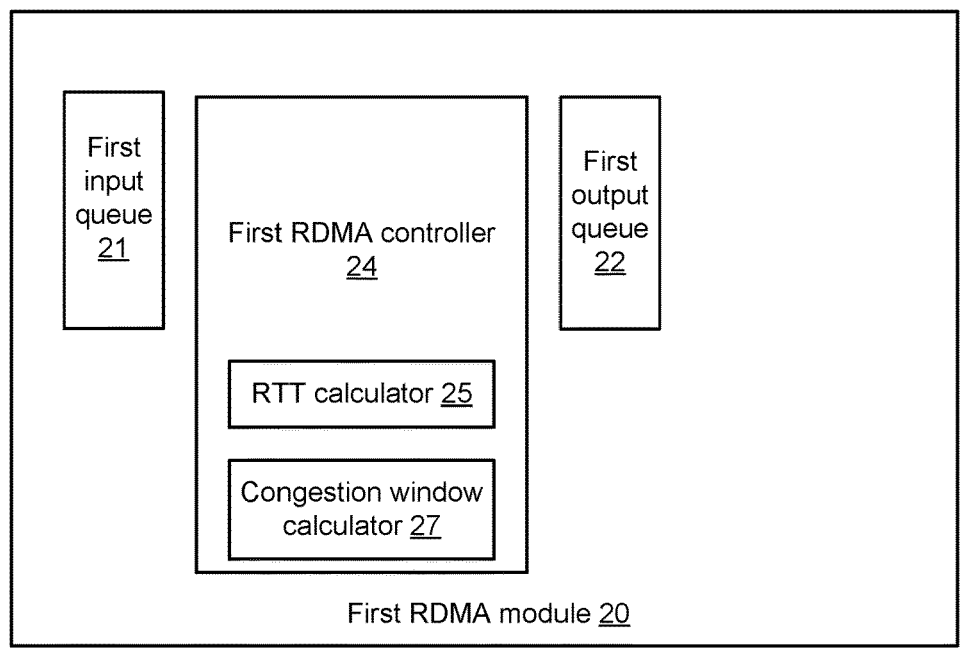
FIG. 5 illustrates an example of a first RDMA module, and of a second RDMA module.
Figure 5:
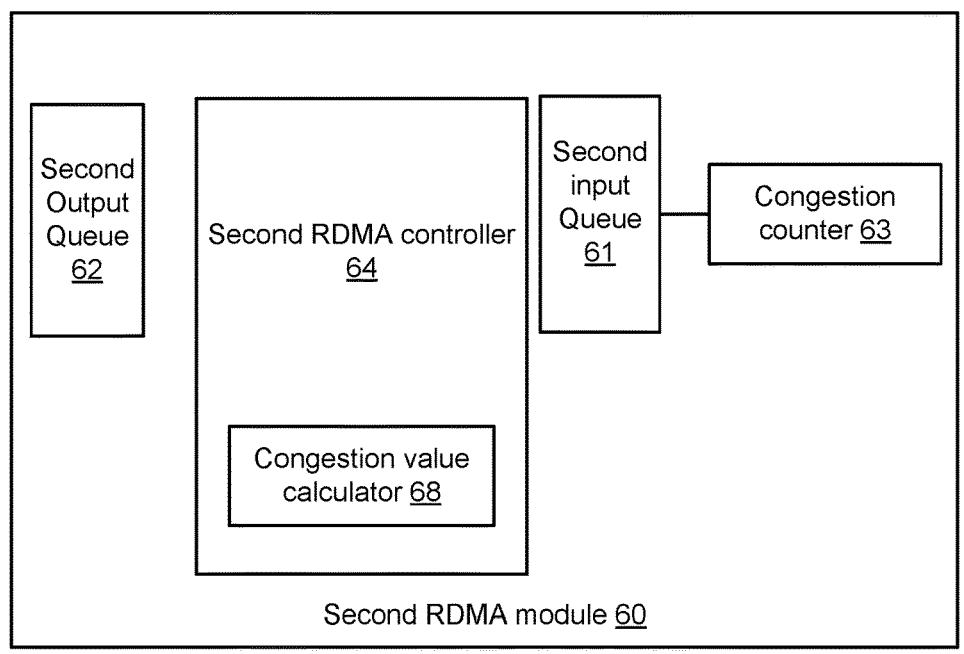

FIG. 5 illustrates an example of a first RDMA module 20 and of a second RDMA module 60.

The first RDMA module 20 may include a first input queue 21, a first output queue 22, and first RDMA controller 24.

The first RDMA controller 24 may include RTT calculator 25 and congestion window calculator 27. Alternatively—at least one of the RTT calculator 25 and congestion window calculator 27 may be located outside the first RDMA controller 24. It should be noted that the RTT is merely an example of a communication parameter—and that any other communication parameter can be calculated.

The RTT calculator 25 is configured to calculate RTT of one or more RDMA packets of a group of RDMA packets. The RTT calculator 25 may, for example, execute step 230 of method 201.

The congestion window calculator 27 may be configured to calculate a next value of the congestion window. The calculation may be based, at least on the congestion value provided from the responder device. The congestion window calculator 27 may, for example, execute at least one of step 240 of method 200 and step 241 of method 201.

The second RDMA module 60 may include a second input queue 61, a second output queue 62, congestion counter 63, and second RDMA controller 64.

The second RDMA controller 64 may include congestion value calculator 68. Alternatively—congestion value calculator 68 may be located outside the second RDMA controller 24.

The congestion value calculator 68 may calculate the congestion value. The congestion value may be indicative of the number of RDMA packets of the current group of RDMA packets that were received by the responder device and were associated with a congestion. In FIG. 5, the congestion counter 63 counts the number of such RDMA packets that are stored in the second output queue 62.

The congestion counter 63 may execute step 320 of method 300. Thus—the determining, by the responder device, the number of RDMA packets of the current group of RDMA packets that were associated with the congestion—may include counting, by the congestion counter 63 the number of packets that were tagged as being associated with congestion.

The congestion value calculator 68 may execute step 330 of method 300.

A single device or system may include both a responder device and a requester device. Such a device or system may include a single RDMA module for incoming and outgoing traffic. Alternatively—such a device or system may include different RDMA modules for incoming traffic and outcoming traffic. For simplicity of explanation—other units shown in FIG. 5 may be allocated only for incoming traffic (see congestion counter 63 and congestion value calculator) or only form outgoing traffic (congestion window calculator 27).

Figure 6:
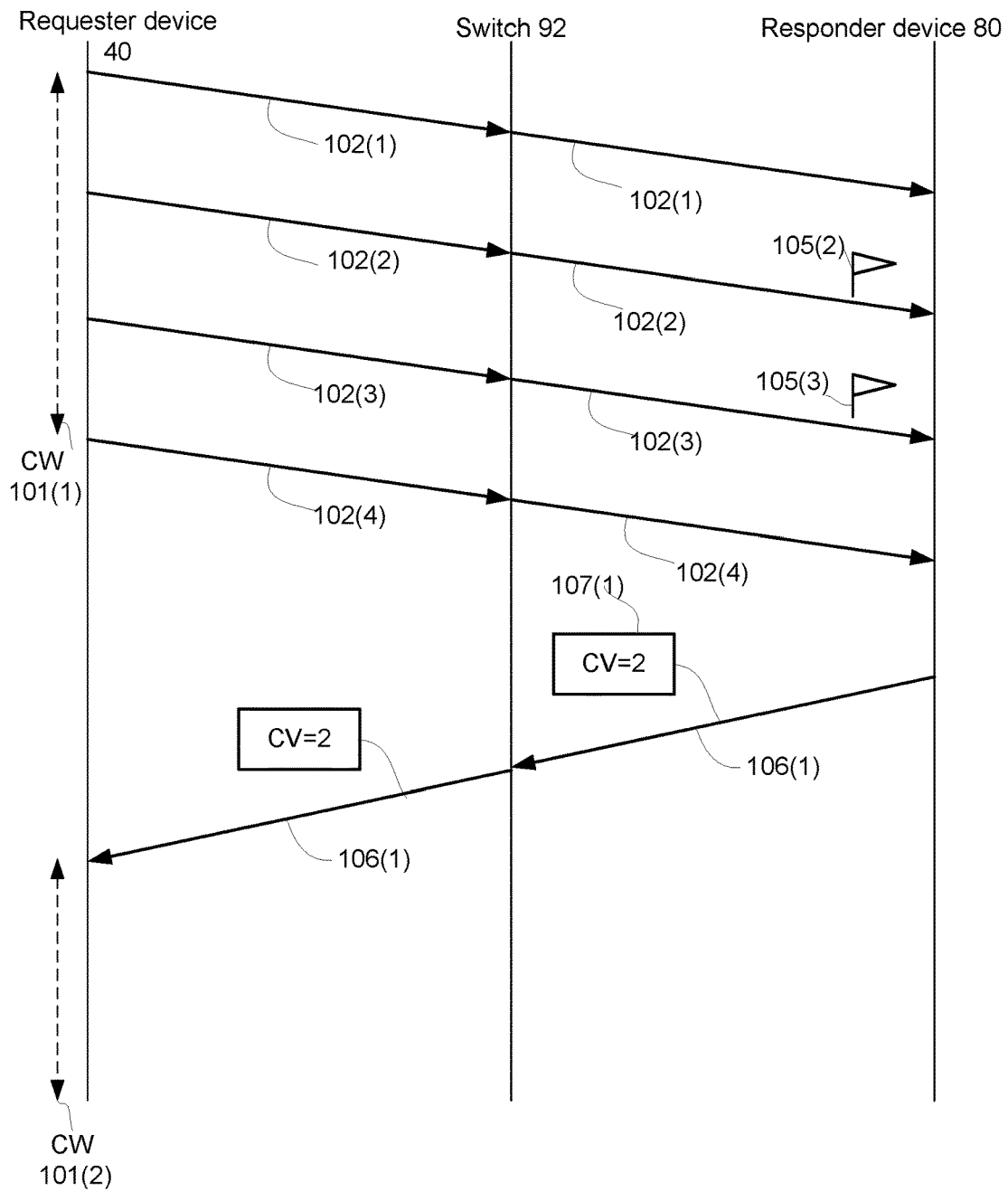
FIG. 6 illustrates an example of a timing diagram.

FIG. 6 illustrates an example of a timing diagram 100 in which (a) A current group of four RDMA packets 102(1)-102(4) are sent from requester device 40 to switch 92. The first congestion window CW 101(1) allows a transmission of four RDMA packets.

(b) The switch 92 tags (see congestion indicators 105(2) and 105(3)) the second and third RDMA packets of the current group as being associated with the congestion.

(c) The responder device 80 counts two RDMA packets of the current group as being associated with the congestion and calculates a congestion value (CV) 107(1) that indicates ("CV=2") that two RDMA packets of the current group as being associated with the congestion.

(d) The responder sends the ACK message 106(1), via switch 92, to requester device 40.

(e) The requestor device calculates the next value of the congestion window (CW 102(2)). In FIG. 6 the congestion window was shortened to allow a transmission of three RDMA packets. Step (e) may be followed by step (a) in which the next value becomes the current value.

FIG. 7 illustrates an example of an ACK message 107(1).

ACK message 107(1) include, for example, the following fields: MAC address field—MAC 107(1,1), virtual local area network (VLAN) address field—VLAN 107(1,2), Internet Protocol version four (IPV4) field—IPV4 107(1,3), user datagram protocol (UDP) field—UDP 107(1,4), base transport header (BTH) field—BTH 107(1,5), Acknowledge Extended Transport Header (AETH) field—ATEH 107(1,6), ECR field (includes the congestion value)—ECR field 107(1,7), invariant cyclic redundancy check (ICRC) field—ICRC 107(1,8), and FCS field—frame check sequence (FCS) (107,1,9).

It should be noted that the ACK message include fields that refer to a certain protocols stack—while other ACK messages may include other fields—that correspond to other protocols stack.

It should be noted that the next value of the congestion window may be determined by the responder device and not by the requestor device. The responder device may, in some cases, better evaluate the state of the network or any other relevant parameters as it receives all or at least some of the RDMA packets of the current group.

Alternatively—both requestor device and responder device may determine the next value of the congestion window—and these next values may be compared to each other, used for verification of each other, may be used to select one of the next values, and the like.

Figure 8:
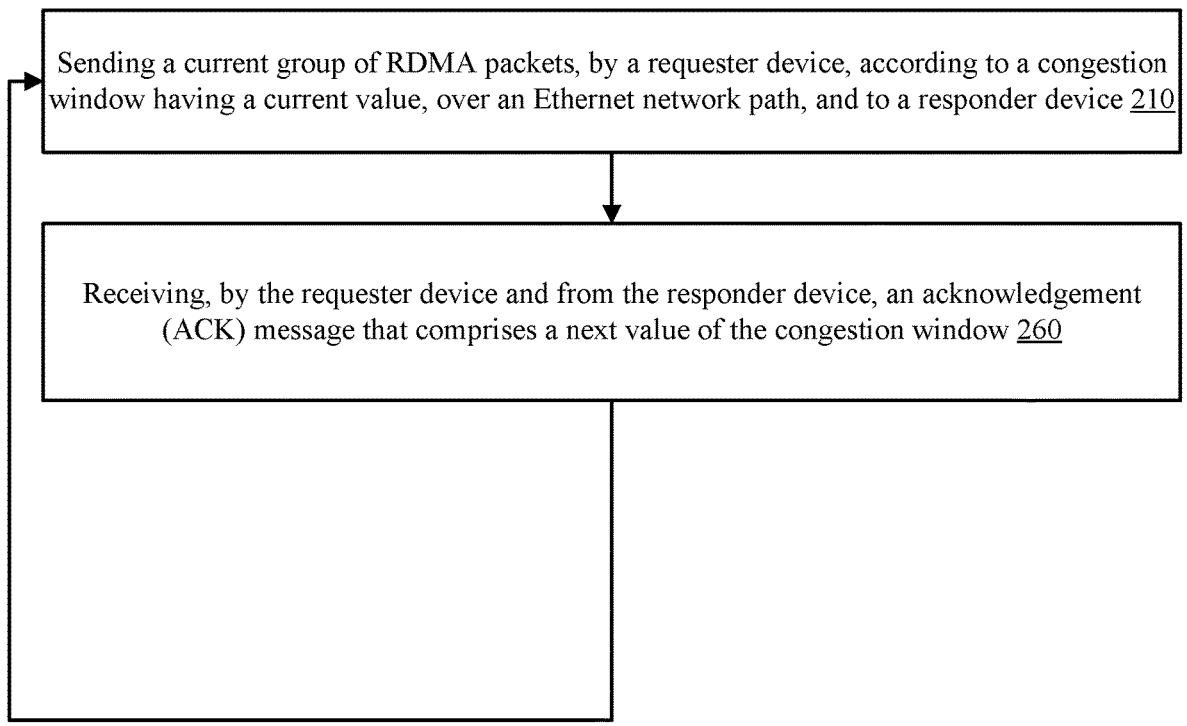

FIG. 8 illustrates an example of method 202.

Method 202 may start by step 210 of sending a current group of RDMA packets, by a requester device, according to a congestion window having a current value, over an Ethernet network path, and to a responder device.

Step 210 may be followed by step 260 of receiving, by the requester device and from the responder device, an acknowledgement (ACK) message that includes a next value of the congestion window.

Multiple iterations of method 202 may be executed. Accordingly—step 260 may be followed by step 210. The next value received in step 260 will become the current value of the congestion window during step 210 of the next iteration.

Figure 9:
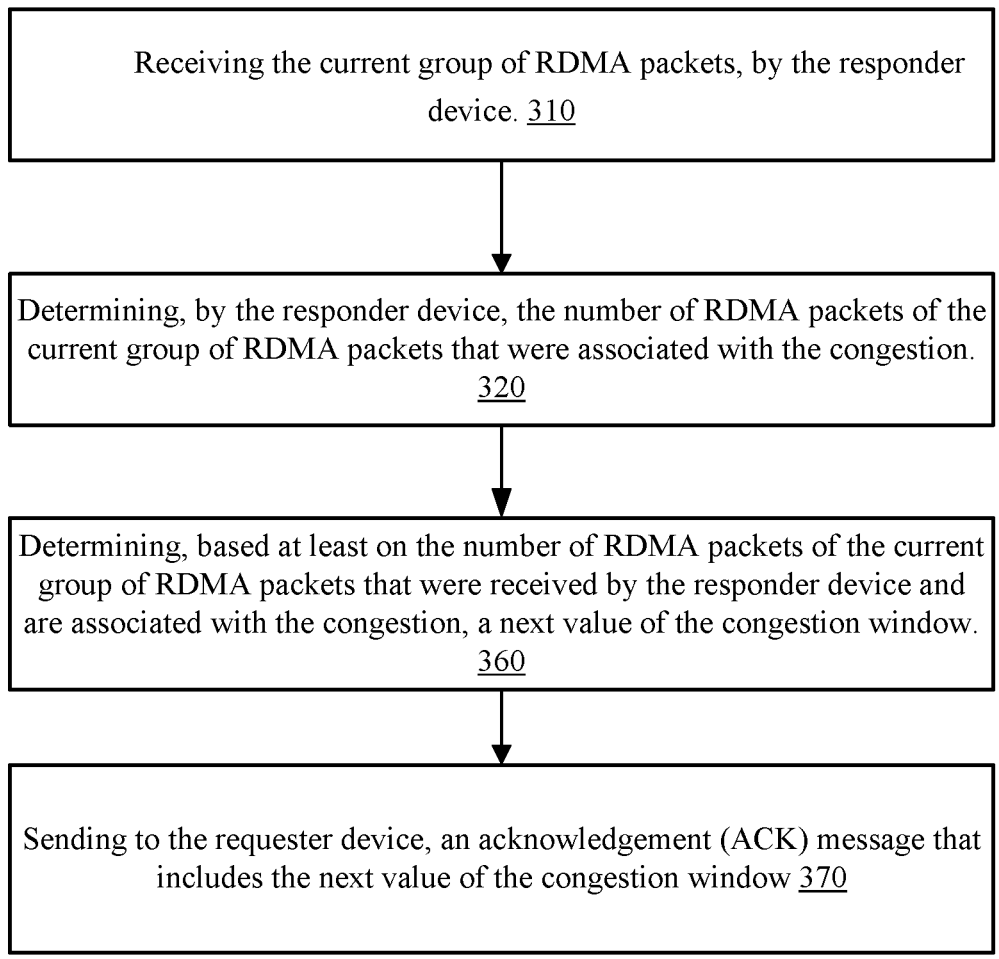

FIG. 9 illustrates an example of method 302.

Method 302 may start by step 310 of receiving the current group of RDMA packets, by the responder device.

Step 310 of method 302 may be preceded by step 210 of method 202.

Step 310 may be followed by step 320 of determining, by the responder device, the number of RDMA packets of the current group of RDMA packets that were associated with the congestion.

Step 320 may be followed by step 360 of determining, based at least on the number of RDMA packets of the current group of RDMA packets that were received by the responder device and are associated with the congestion, a next value of the congestion window.

The determination may be based on additional parameters—such one or more communication parameters—for example the rate of reception of the RDMA packets of the current group.

Step 360 may include using a congestion counter to count the number of RDMA packets of the current group of RDMA packets that were associated with the congestion.

Step 360 may be followed by step 370 of sending to the requester device, an acknowledgement (ACK) message that includes the next value of the congestion window.

Step 370 of method 300 may be followed by step 260 of method 202.

It should be noted that the ACK message may have the format illustrated in FIG. 7—whereas the next value is included in ECR field 107(1,7).

Figure 10:
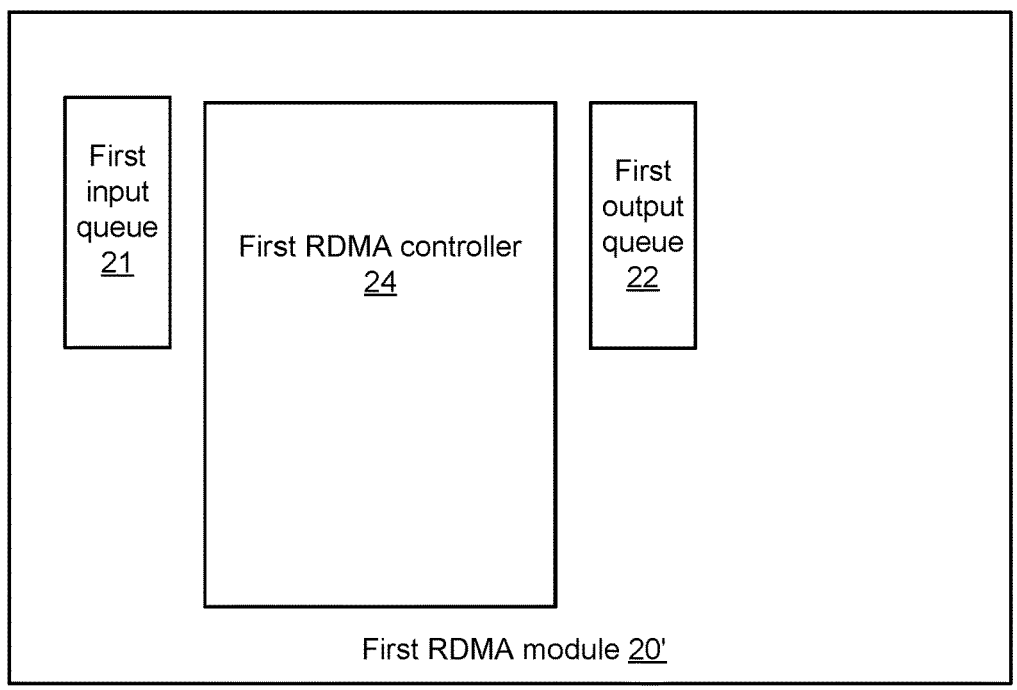
Figure 10:
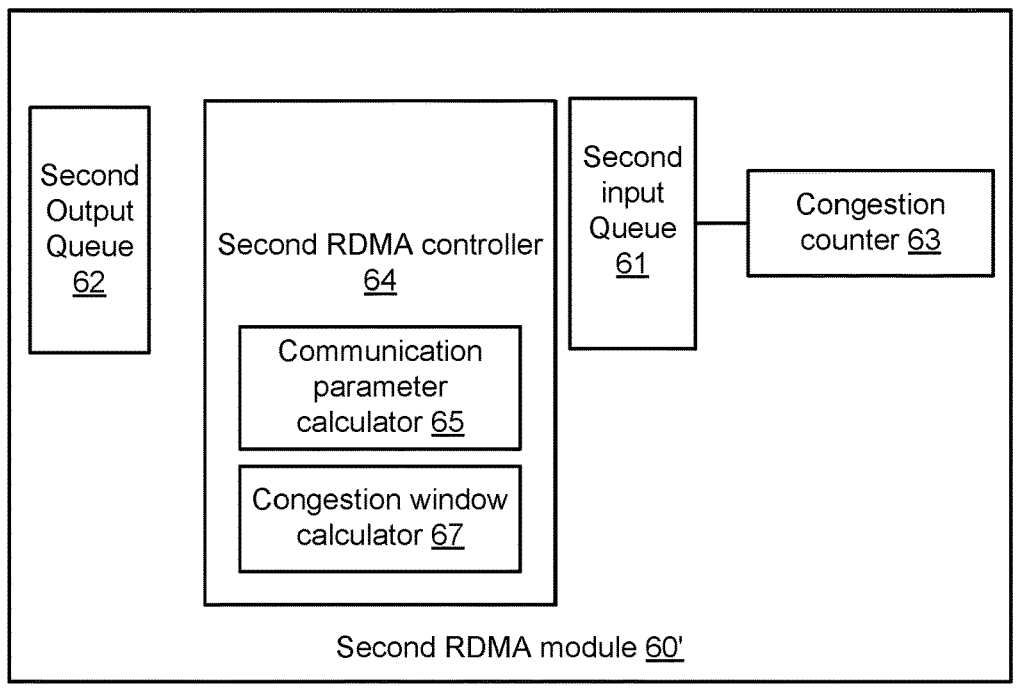

FIG. 10 illustrates an example of a first RDMA module 20' and of a second RDMA module 60'.

The first RDMA module 20' may include a first input queue 21, a first output queue 22, and first RDMA controller 24.

The second RDMA module 60' may include a second input queue 61, a second output queue 62, congestion counter 63, and second RDMA controller 64.

The second RDMA controller 64 may include congestion window calculator 67 that may be configured to calculate a next value of the congestion window. The calculation may be based, at least, on the number of RDMA packets of the current group of RDMA packets that were received by the responder device and are associated with the congestion.

The congestion window calculator 67 may, for example, execute step 360 of method 300.

The second RDMA controller 64 may also include communication parameter calculator 65 for calculating one or more communication parameters that may assign in the calculation of the next value of the congestion window.

The congestion counter 63 counts the number of RDMA packets that are stored in the second output queue 62.

The congestion counter 63 may execute step 320 of method 300. Thus—the determining, by the responder device, the number of RDMA packets of the current group of RDMA packets that were associated with the congestion—may include counting, by the congestion counter 63 the number of packets that were tagged as being associated with congestion.

Some of the mentioned above examples (see for example FIG. 6) illustrate that all RDMA packets sent by the requestor were received by responder. This is not necessarily so. If an RDMA packets is lost then the RDMA packets that were sent as a group and precede the lost RDMA packets will be regarded as a current group of RDMA packets. For example—if ten RDMA packets are sent as a group but the ninth RDMA packets was lost—the calculation of the congestion window may refer to the first till eighth RDMA packets as a current group—but may calculate the next congestion window taking into account the lost packet. For example—in such a case the next congestion window value may be calculated based, at least, on the loss of the RDMA packet. For example—the next value may be a predefined fraction (for example by multiplying the current value by a positive factor that is smaller than one—for example one half).

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

Any reference to comprising or including should be applied mutatis mutandis to consisting and/or to "consisting essentially of".

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A method for remote direct memory access (RDMA) congestion control, the method comprising:
    sending a current group of RDMA packets, by a requester device, according to a congestion window having a current value, over an Ethernet network path, and to a responder device;
    receiving, by the requester device and from the responder device, an acknowledgement (ACK) message that comprises a congestion value, the congestion value is indicative of a number of RDMA packets of the current group of RDMA packets that were received by the responder device and were associated with a congestion; and
    determining a next value of the congestion window based on the congestion value; wherein the determining of the next value of the congestion window comprises:
    (a) determining a first next value of the congestion window by the responder device,
    (b) determining a second next value of the congestion window by the requestor device; and
    (c) selecting the next value of the congestion window out of the first next value of the congestion window and the second next value of the congestion window.

2. The method according to claim 1 comprising calculating, by the requester device and for at least one of the RDMA packets of the current group of RDMA packets, a round trip time (RTT).

3. The method according to claim 2 wherein the determining of the next value of the congestion window is also based on the RTT.

4. The method according to claim 3 wherein the determining of the next value of the congestion window is also based on the current value of the congestion window.

5. The method according to claim 1 wherein the determining of the next value of the congestion window is also based on the current value of the congestion window.

6. The method according to claim 1 wherein the RDMA packet is a RDMA over Converged Ethernet (RoCE) version two packet.

7. The method according to claim 1 wherein each one of the requester device and the responder device comprises a network interface card (NIC).

8. The method according to claim 1 comprising receiving the ACK message only for a last RDMA packet of the current group.

9. The method according to claim 1 wherein each RDMA packet of the current group of RDMA packets that was associated with a congestion comprises an explicit congestion notification (ECN).

10. The method according to claim 1 wherein the ACK message comprises a field dedicated to the congestion value.

11. The method according to claim 1 comprising:
receiving the current group of RDMA packets, by the responder device;
determining, by the responder device, the number of RDMA packets of the current group of RDMA packets that were associated with the congestion; and
generating the congestion value, based on the number of RDMA packets of the current group of RDMA packets that were associated with the congestion.

12. The method according to claim 11 comprising determining to generate the congestion value following a reception of last RDMA packet of the current group of RDMA packets.

13. The method according to claim 11 comprising using a congestion counter to count the number of RDMA packets of the current group of RDMA packets that were associated with the congestion.

14. The method according to claim 13 comprising resetting the congestion counter following a generation of the congestion value.

15. The method according to claim 11 comprising storing RDMA packets of the current group of RDMA packets in a queue allocated to traffic from the requester device.

16. The method according to claim 1 comprising comparing the first next value of the congestion window to the second next value of the congestion window.

17. The method according to claim 1 comprising verifying one of the first and second next values of the congestion window to the second one of the first and second next value of the congestion window.

18. A non-transitory computer readable medium for remote direct memory access (RDMA) congestion control, the non-transitory computer readable medium stores instructions for:
sending a current group of RDMA packets, by a requester device, according to a congestion window having a current value, over an Ethernet network path, and to a responder device;
receiving, by the requester device and from the responder device, an acknowledgement (ACK) message that comprises a congestion value, the congestion value is indicative of a number of RDMA packets of the current group of RDMA packets that were received by the responder device and were associated with a congestion; and
determining a next value of the congestion window based on the congestion value;
wherein the determining of the next value of the congestion window comprises:
(a) determining a first next value of the congestion window by the responder device,
(b) determining a second next value of the congestion window by the requestor device; and
selecting the next value of the congestion window out of the first next value of the congestion window and the second next value of the congestion window.

19. The non-transitory computer readable medium according to claim 18 wherein the determining of the next value of the congestion window comprises (a) determining a first next value of the congestion window by the responder device, and (b) determining a second next value of the congestion window by the requestor device.

20. The non-transitory computer readable medium according to claim 19 wherein the determining of the next value of the congestion window comprises selecting the next value of the congestion window out of the first next value of the congestion window and the second next value of the congestion window.

21. The non-transitory computer readable medium according to claim 19 wherein the determining of the next value of the congestion window is executed by the responder device.

22. A system that comprises a requester device and a responder device; wherein the requester device comprises: an output for sending a current group of remote direct memory access (RDMA) packets, according to a congestion window having a current value, over an Ethernet network path, and to the responder device; an input for receiving, from the responder device, an acknowledgement (ACK) message that comprises a congestion value, the congestion value is indicative of a number of RDMA packets of the current group of RDMA packets that were received by the responder device and were associated with a congestion; and a controller; wherein the system is configured to determine a first next value of the congestion window based on the congestion value, by;
(a) determining a first next value of the congestion window by the responder device,
(b) determining a second next value of the congestion window by the requestor device; and
(c) selecting the next value of the congestion window out of the first next value of the congestion window and the second next value of the congestion window.

23. The system according to claim 22 wherein the controller of the requester device is configured to determine a first next value of the congestion window based on the congestion value; wherein the responder device is configured to determine a second next value of the congestion window; and wherein the system is configured to determine the congestion window based on at least one of the first next value of the congestion window based on the congestion value and the second next value of the congestion window based on the congestion value.

* * * * *